(12) United States Patent
Li (10) Patent No.: US 12,426,119 B2
(45) Date of Patent: Sep. 23, 2025

(54) METHOD FOR COMMUNICATION PROCESSING

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 301 days.

(21) Appl. No.: 17/784,564

(22) PCT Filed: Dec. 13, 2019

(86) PCT No.: PCT/CN2019/125333
§ 371 (c)(1),
(2) Date: Jun. 10, 2022

(87) PCT Pub. No.: WO2021/114271
PCT Pub. Date: Jun. 17, 2021

(65) Prior Publication Data
US 2023/0009059 A1    Jan. 12, 2023

(51) Int. Cl.
*H04W 76/19* (2018.01)
*H04B 7/0404* (2017.01)
(Continued)

(52) U.S. Cl.
CPC .......... *H04W 76/19* (2018.02); *H04B 17/318* (2015.01); *H04B 17/336* (2015.01);
(Continued)

(58) Field of Classification Search
CPC ... H04W 76/19; H04W 24/10; H04W 36/185; H04W 36/304; H04W 72/21; H04W 72/23; H04W 74/0833; H04W 36/0085; H04B 17/318; H04B 17/336; H04B 7/0608; H04B 7/0691; H04B 7/06956; H04B 7/0874; H04B 7/0404
See application file for complete search history.

(56) References Cited

U.S. PATENT DOCUMENTS

2016/0014662 A1* 1/2016 Yiu ................. H04W 48/20
455/436
2020/0350977 A1* 11/2020 Ryu ................ H04W 74/0833
(Continued)

FOREIGN PATENT DOCUMENTS

CN    102413520 A    4/2012
CN    104782159 A    7/2015
(Continued)

OTHER PUBLICATIONS

Indian Patent Application No. 202247039190 Office Action dated Oct. 19, 2022, 7 pages.
(Continued)

*Primary Examiner* — Harry H Kim
(74) *Attorney, Agent, or Firm* — Cozen O'Connor (57) ABSTRACT

A communication processing method is performed by a user equipment (UE), the UE including at least a first antenna panel and a second antenna panel. The communication processing method includes: communicating with a serving cell by the first antenna panel, and communicating with a target cell by using the second antenna panel.

17 Claims, 4 Drawing Sheets

(51) Int. Cl.
- *H04B 7/06* (2006.01)
- *H04B 7/08* (2006.01)
- *H04B 17/318* (2015.01)
- *H04B 17/336* (2015.01)
- *H04W 24/10* (2009.01)
- *H04W 36/00* (2009.01)
- *H04W 36/18* (2009.01)
- *H04W 36/30* (2009.01)
- *H04W 72/21* (2023.01)
- *H04W 72/23* (2023.01)
- *H04W 74/0833* (2024.01)

(52) U.S. Cl.
CPC ......... *H04W 24/10* (2013.01); *H04W 36/185* (2023.05); *H04W 36/304* (2023.05); *H04W 72/21* (2023.01); *H04W 72/23* (2023.01); *H04W 74/0833* (2013.01)

(56) References Cited

U.S. PATENT DOCUMENTS

| | | | |
|---|---|---|---|
| 2021/0028540 A1* | 1/2021 | Rom | H01Q 21/28 |
| 2021/0058971 A1* | 2/2021 | MolavianJazi | H04B 17/318 |
| 2021/0105673 A1* | 4/2021 | Jassal | H04W 36/185 |
| 2023/0080333 A1 | 3/2023 | Li | |
| 2023/0098488 A1 | 3/2023 | Li | |

FOREIGN PATENT DOCUMENTS

| | | |
|---|---|---|
| CN | 103369582 B | 8/2016 |
| CN | 110463264 A | 11/2019 |
| CN | 110537334 A | 12/2019 |
| EP | 3018855 B1 | 3/2019 |
| KR | 101991761 B1 | 6/2019 |

OTHER PUBLICATIONS

European Patent Application No. 19955771.1, Search and Opinion dated Jul. 24, 2023, 14 pages.

PCT/CN2019/125333 English translation of International Search Report dated Sep. 23, 2020, 2 pages.

ZTE "Discussion on NR Mobility Enhancements in Physical Layer" 3GPP TSG RAN WG1 #96bis; R1-1904157; Apr. 2019; 5 pages.

ZTE "Discussion on NR Mobility Enhancements in Physical Layer" 3GPP TSG RAN WG1 #97; R1-1906423; May 2019; 7 pages.

Indian Patent Application No. 202247039190, Office Action dated Mar. 7, 2025, 2 pages.

Chinese Patent Application No. 202310429984.4, Office Action dated Jun. 19, 2025, with English translation, 24 pages.

Intel Corporation, "Discussion on uplink multi-panel and multi-TRP operation", 3GPP TSG-RAN WG1 #89, R1-1707352, May 2017, 2 pages.

* cited by examiner

FIG. 1 communicating with a serving cell by the first antenna panel, and communicating with a target cell by using the second antenna panel — S11

FIG. 2 communicating with a first antenna panel in user equipment (UE) — S21

FIG. 3 communicating with a second antenna panel in user equipment (UE) — S31

FIG. 9

METHOD FOR COMMUNICATION PROCESSING

CROSS-REFERENCE TO RELATED APPLICATION

The present application is a U.S. national stage of International Application No. PCT/CN2019/125333, filed on Dec. 13, 2019, the contents of which are incorporated herein by reference in their entireties for all purposes.

BACKGROUND

In the 5th generation mobile networks (5th generation wireless systems, 5G for short) New Radio (NR) system, especially when the communication frequency band is above 6 GHz, due to the fast attenuation of high-frequency channels, beam-based transmission and reception is used in order to ensure the coverage range.

When the base station has multiple transmitter receiver points (TRPs) and each TRP has one or more transmit antenna panels, or when the base station has only one TRP and the TRP has multiple transmit antenna panels, the base station can use multiple panels simultaneously to send data to the same user equipment (UE), and the multiple panels may come from the same TRP or different TRPs. Similarly, when the terminal also has multiple panels, the terminal can use multiple panels to send data to the base station.

SUMMARY

According to a first aspect of the present disclosure, a communication processing method is provided. The method is performed by user equipment (UE). The UE includes at least a first antenna panel and a second antenna panel. The method includes:

communicating with a serving cell by the first antenna panel, and communicating with a target cell by the second antenna panel.

According to a second aspect of the present disclosure, a communication processing method is provided. The method is performed by a serving base station. The method includes:

communicating with a first antenna panel in user equipment (UE).

According to a third aspect of the present disclosure, a communication processing method is provided. The method is performed by a target base station. The method includes:

communicating with a second antenna panel in user equipment (UE).

It is to be understood that both the foregoing general description and the following detailed description are exemplary and explanatory only and are not restrictive of the present disclosure, as claimed.

BRIEF DESCRIPTION OF THE DRAWINGS

The accompanying drawings herein, which are incorporated in and constitute a part of this specification, illustrate exemplary embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the embodiments of the disclosure are only for the purpose of describing particular embodiments, but should not be construed to limit the embodiments of the disclosure. As used in the description of the present disclosure and the appended claims, "a", "an" and "the" in singular forms mean including plural forms, unless clearly indicated in the context otherwise. It should also be understood that, as used herein, the term "and/or" represents and contains any one and all possible combinations of one or more associated listed items.

It should be understood that, although terms such as "first", "second" and "third" are used herein for describing various elements, these elements should not be limited by these terms. These terms are only used for distinguishing one type of information from another type of information. For example, first information may also be called second information, and similarly, the second information may also be called the first information, without departing from the scope of the present disclosure. As used herein, the term "if" may be construed to mean "when" or "upon" or "in response to determining", depending on the context.

Figure 1:
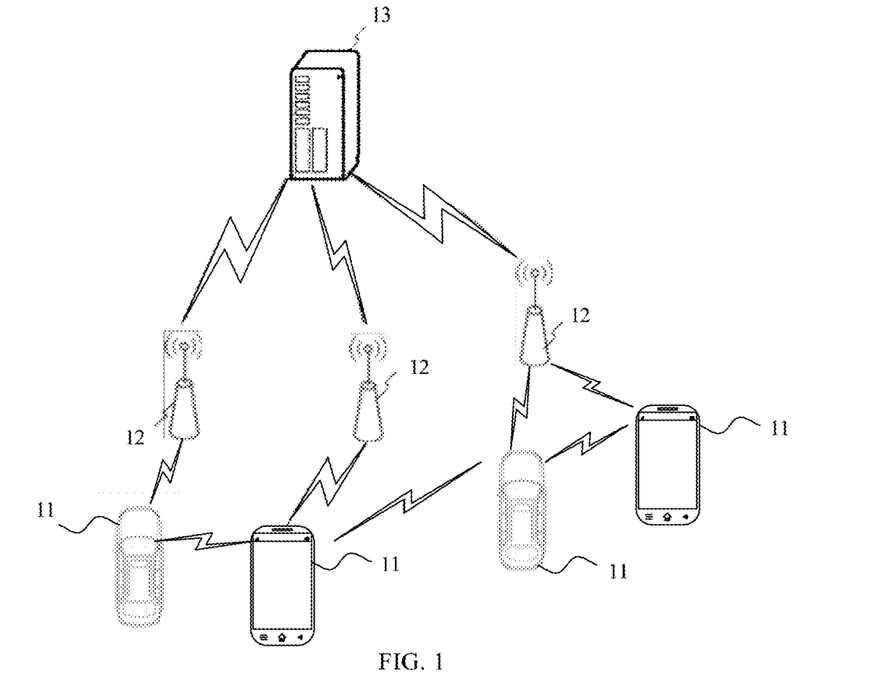
FIG. 1 is a schematic diagram of a wireless communication system according to an embodiment of the disclosure.

With reference to FIG. 1, FIG. 1 is a schematic diagram illustrating a wireless communication system according to an embodiment of the disclosure. As illustrated in FIG. 1, the wireless communication system is a communication system based on the cellular mobile communication technology. The wireless communication system may include several terminals 11 and several base stations 12.

The terminal 11 may be a device that provides voice and/or data connectivity to a user. The terminal 11 can communicate with one or more core networks via a radio access network (RAN). The terminal 11 can be an IoT terminal, such as a sensor device, a mobile phone (or a cellular phone), and a computer having an IoT terminal, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, a user device, or user equipment (UE). Alternatively, the terminal 11 may also be a device of an unmanned aerial vehicle. Alternatively, the terminal 11 may also be an in-vehicle device, for example, the terminal 11 may be a vehicle-mounted computer with a wireless communication function, or a wireless communication device externally connected to a vehicle-mounted computer. Alternatively, the terminal 11 may also be a roadside device, for example, a road light, a traffic light or other roadside devices that has a wireless communication function.

The base station 12 may be a network side device in the wireless communication system. The wireless communication system may be the 4th generation mobile communication (4G), also known as long term evolution (LTE). Alternatively, the wireless communication system may also be the 5th generation mobile communication (5G) system, also known as the new radio (NR) system or 5G NR system. Alternatively, the wireless communication system may also be a next-generation system of the 5G system. An access network in the 5G system may be called as a new generation radio access network (NG-RAN). Alternatively, the wireless communication system may also be machine-type communication (MTC) system.

The base station 12 may be an evolved node base station (eNB) used in 4G system. Alternatively, the base station 12 may also be a base station (gNB) adopting a centralized and distributed architecture in the 5G system. When the base station 12 adopts the centralized and distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 12.

A wireless connection can be established between the base station 12 and the terminal 11 through a wireless air interface. In different embodiments, the wireless air interface is a wireless air interface based on the 5G standard. For example, the wireless air interface is the NR. Alternatively, the wireless air interface can also be a wireless air interface based on a standard of next generation mobile communication network technology based on the 5G.

In some embodiments, an end to end (E2E) connection can be established between the terminals 11, such as vehicle to vehicle (V2X) communication, vehicle to infrastructure (V2I) communication, vehicle to pedestrian (V2P) communication and other scenarios in vehicle to everything (V2X) communication.

In some embodiments, the above wireless communication system may further include a network management device 13.

A plurality of the base stations 12 are connected to the network management device 13 respectively. The network management device 13 may be a core network device in the wireless communication system. For example, the network management device 13 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 13 is not limited in the embodiment of the disclosure.

In the NR system, especially when the communication frequency band is in above 6 GHz, due to fast attenuation of a high-frequency channel, beam-based transmission and reception is used in order to ensure the coverage range. At present, the base station and UE both use one panel to send or receive data.

When the base station has multiple transmitter receiver points (TRPs) and each TRP has one or more transmit antenna panels, or when the base station has only one TRP and the TRP has multiple transmit antenna panels, the base station can use multiple panels (the multiple panels may come from the same TRP or different TRPs) simultaneously to send data to the same user equipment (UE). Similarly, when the UE also has multiple panels, the UE can use multiple panels to send data to the base station. Then, when the UE needs a handover, panel-based handover may be used. However, how to use multiple panels to realize seamless handover is a technical problem to be solved urgently.

Based on the wireless communication system mentioned above, when the UE has multiple panels, how to use multiple panels to realize seamless handover to ensure the continuity of communication in the handover process is proposed, and the embodiments of the method in the disclosure are proposed.

The present disclosure relates to a field of communication technologies, in particular, relates to a communication processing method and device, and a computer storage medium.

Figure 2:
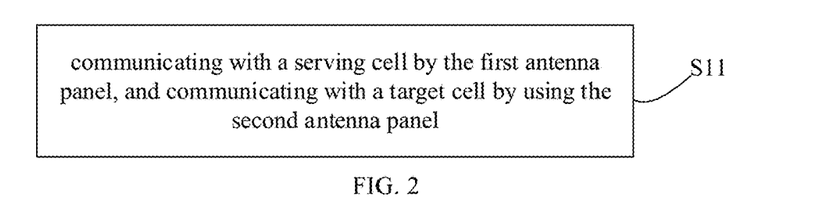
FIG. 2 is a flowchart of a communication processing method according to an embodiment of the disclosure.

FIG. 2 is a flowchart 1 of a communication processing method according to an embodiment of the disclosure. As illustrated in FIG. 2, the communication processing method is used in user equipment (UE), and includes following steps.

At step S11, the first antenna panel in the UE is used to communicate with a serving cell, and a second antenna panel in the UE is used to communicate with a target cell. The UE includes at least the first antenna panel and the second antenna panel.

With the technical solution in the embodiments of the disclosure, the UE communicates with the serving cell and the target cell respectively by different antenna panels, hence realizing seamless handover, ensuring the continuity of communication during the handover process, and reducing handover interruption time, and improving the terminal throughput.

In some embodiments, communicating with the target cell by the second antenna panel includes:

communicating with the target cell by the second antenna panel in response to a measurement result measured by the second antenna panel being that a receiving signal of the target cell satisfies a first preset condition.

In some implementations, the first preset condition includes at least one of:

a difference value between a reference signal receiving power (RSRP) of the target cell and a RSRP of the serving cell is greater than a first threshold; or a difference value between reference signal receiving quality (RSRQ) of the target cell and RSRQ of the serving cell is greater than a second threshold; or a difference value between a signal to interference plus noise ratio (SINR) of the target cell and a SINR of the serving cell is greater than a third threshold.

That is, when the measurement result obtained by the UE using the second antenna panel is that the receiving signal of the target cell is better than the receiving signal of the serving cell, the UE uses the second antenna panel to communicate with the target cell.

For example, when the RSRP of the target cell is higher than the RSRP of the serving cell by the first threshold, or when the RSRQ of the target cell is higher than the RSRQ of the serving cell by the second threshold, or when the SINR of the target cell is higher than the SINR of the serving cell by the third threshold, the second antenna panel is used to communicate with the target cell.

It should be noted that, the first threshold, the second threshold and the third threshold may be set or adjusted according to actual conditions such as communication quality.

In other implementations, the first preset condition includes at least one of:
- a RSRP of the serving cell being smaller than a first reference value, and a RSRP of the target cell being greater than a second reference value, the second reference value being greater than or equal to the first reference value; or
- RSRQ of the serving cell being smaller than a third reference value, and RSRQ of the target cell being greater than a fourth reference value, the fourth reference value being greater than or equal to the third reference value; or
- a SINR of the serving cell being smaller than a fifth reference value, and a SINR of the target cell being greater than a sixth reference value, the sixth reference value being greater than or equal to the fifth reference value.

That is, when the measurement result obtained by the UE using the second antenna panel is that the receiving signal of the target cell is better, the UE uses the second antenna panel to communicate with the target cell.

It should be noted that the first reference value, the second reference value, the third reference value, the fourth reference value, the fifth reference value and the sixth reference value may be set or adjusted based on actual conditions such as communication quality.

The above RSRP, RSRQ, and SINR may be a value of L1 and/or a value of L3. The value of L1 is an instantaneous sampling value of a physical layer; the value of L3 is a radio resource management (RRM) measurement value obtained by averaging an average value of multiple physical layer sampling values by a sliding window.

In some embodiments, communicating with the serving cell by the first antenna panel and communicating with the target cell by the second antenna panel includes:
performing random access with the target cell by the second antenna panel, and disconnecting connection between the first antenna panel and the serving cell in response to the random access being successful.

In this way, the first antenna panel of the terminal maintains communication with the serving cell during the process of using the second antenna panel to perform the random access with the target cell, and the first antenna panel may interrupt the communication with the serving cell only after the random access between the second antenna panel and the target cell is successful and the second antenna panel can communicate with the target cell normally. Therefore, the terminal has at least one antenna panel that maintains data communication with the serving cell or the target cell, hence enabling seamless handover and ensuring the continuity of communication during the handover process.

In some embodiments, after disconnecting the connection between the first antenna panel and the serving cell, the method further includes:
determining a timing advance (TA) for communication between the first antenna panel and the target cell; and
performing, by the first antenna panel, data transmission with the target cell according to the TA.

Here, the data transmission may transmission of uplink data.

In this way, after the success of the random access procedure between the second antenna panel and the target cell, the UE disconnects the connection between the first antenna panel and the serving cell, and then the first antenna panel of the UE may hand over to the target cell. The TA of communication with the target cell may be obtained when the first antenna panel handovers to the target cell, so that the acquired TA can be used for data transmission with the target cell, which can realize the handover of the first antenna panel from the serving cell to the target cell, and both the first antenna and the second antenna panel are successfully handed over to the target cell, ensuring the continuity of communication during the handover process.

In some embodiments, determining the TA of communication between the first antenna panel and the target cell includes:
determining the TA of communication between the first antenna panel and the target cell by performing random access with the target cell through the first antenna panel.

In this way, the TA of the communication between the first antenna panel and the target cell is determined through random access, so that the acquired TA value is more accurate.

In some embodiments, determining the TA of communication between the first antenna panel and the target cell includes:
determining the TA of communication between the first antenna panel and the target cell based on a TA value of communication between the second antenna panel and the target cell.

For example, the TA value of the communication between the second antenna panel and the target cell is taken as the TA of the communication between the first antenna panel and the target cell.

For another example, according to the TA value of the communication between the second antenna panel and the target cell, the TA of the communication between the first antenna panel and the target cell is calculated and obtained according to a preset algorithm. It should be noted that the present disclosure does not limit the preset algorithm. Any algorithm that can make the calculated value close to or equal to the TA value obtained through random access can be used as the preset algorithm.

In this way, the TA value of the communication between the second antenna panel and the target cell is used to determine the TA of the communication between the first antenna panel and the target cell, so that the speed of acquiring the TA value is faster and the handover time can be reduced.

In some embodiments, communicating with the serving cell by the first antenna panel and communicating with the target cell by the second antenna panel includes:
after the success of random access procedure to the target cell by the second antenna panel, continuing communicating with the serving cell by the first antenna panel while communicating with the target cell by the second antenna panel, and disconnecting connection between the first antenna panel and the serving cell until a second preset condition is satisfied.

In this way, it can be ensured that each antenna panel is connected to the best cell to ensure the highest throughput.

In some implementations, the second preset condition includes at least one of:

a measurement result measured by the first antenna panel being that a receiving signal of the target cell satisfies a first preset condition; or completing transmission of data to be retransmitted by the first antenna panel, the data to be retransmitted referring to data that is transmitted once but is not successfully transmitted before connection between the second antenna panel and the serving cell is disconnected; or completing transmission of data to be sent to the UE and stored in a base station to which the serving cell belongs by the first antenna panel and the serving cell.

Here, the first preset condition is the same as the first preset condition mentioned above, and details are not repeated here. When the measurement result of the first antenna panel does not meet the first preset condition, it means that the channel condition when the first antenna panel maintains communication with the serving cell is better than the channel condition when the first antenna panel maintains communication with the target cell, so the first antenna panel maintains the communication with the serving cell, while the second antenna panel communicates with the target cell, so that each antenna panel communicates with the cell with the best channel condition, thus the throughput provided by the network to the terminal can be maximized.

Here, completing the transmission means that the transmission is successful, or the transmission is unsuccessful, but a maximum number of retransmissions is reached. The maximum number of retransmissions may be set or adjusted according to actual conditions such as communication quality or communication speed.

Here, the data to be retransmitted refers to data transmitted between the serving cell and the UE, including both data transmitted between the first panel and the serving cell, and data transmitted between the second panel and the serving cell. These data refer to data that have been transmitted once but have not been successfully transmitted until a certain time point. The certain time point refers to a time point when the second antenna panel is disconnected from the serving cell.

In some embodiments, communicating with the serving cell by the first antenna panel while communicating with the target cell by the second antenna panel includes:

based on physical downlink control channel (PDCCH) information sent by the serving cell or the target cell, performing physical downlink shared channel (PDSCH) or physical uplink shared channel (PUSCH) transmission with the serving cell using the first antenna panel, and performing PDSCH or PUSCH transmission with the target cell using the second antenna panel.

The PDCCH information refers to downlink control information (DCI) information carried by PDCCH.

In some implementations, scheduling information for scheduling the PDSCH or the PUSCH of the serving cell and scheduling information for scheduling the PDSCH or the PUSCH of the target cell are carried in same PDCCH information.

That is, the PDCCH information is either all sent by the serving cell or all sent by the target cell.

In other implementations, scheduling information for scheduling the PDSCH or the PUSCH of the serving cell and scheduling information for scheduling the PDSCH or the PUSCH of the target cell are carried in different PDCCH information.

Here, different PDCCHs may refer to: both scheduling information for scheduling the PDSCH or the PUSCH of the serving cell and scheduling information for scheduling the PDSCH or the PUSCH of the target cell being sent by the serving cell but not in the same PDCCH, or both of them being sent by the target cell but not in the same PDCCH. Different PDCCHs may also refer to: sending the PDCCH information for scheduling the PDSCH and PUSCH of the serving cell by the serving cell, and sending the PDCCH for scheduling PDSCH and PUSCH of the target cell by the target cell.

That is, only one cell of the serving cell and the target cell sends the PDCCH to schedule the UE to perform PDSCH or PUSCH transmission with the two cells using two antenna panels respectively. Different PDCCHs may be used for scheduling PDSCH or PUSCH with two cells respectively, or the same PDCCH may be used for scheduling PDSCH or PUSCH with two cells. That is, one PDCCH can only schedule the UE to communicate with one cell, or one PDCCH can schedule the UE to communicate with two cells. In some embodiments, communicating with the serving cell by the first antenna panel while communicating with the target cell by the second antenna panel includes:

based on physical downlink control channel (PDCCH) information sent by the serving cell and the target cell, performing physical downlink shared channel (PDSCH) or physical uplink shared channel (PUSCH) transmission with the serving cell using the first antenna panel, and performing PDSCH or PUSCH transmission with the target cell using the second antenna pane.

The PDCCH information sent by the serving cell and the target cell are the same. The PDCCH information carries scheduling information for scheduling the PDSCH or the PUSCH of the serving cell, and/or scheduling information for scheduling the PDSCH or the PUSCH of the target cell.

That is, both the serving cell and the target cell send the PDCCH and the serving cell and the target cell transmit the same PDCCH. In addition, one PDCCH may schedule the UE to communicate with only one cell, or one PDCCH may schedule the UE to communicate with two cells.

In some embodiments, communicating with the serving cell by the first antenna panel while communicating with the target cell by the second antenna panel includes:

performing PDSCH or the PUSCH transmission with the serving cell by the first antenna panel based on first PDCCH information sent by the serving cell; and performing PDSCH or the PUSCH transmission with the target cell by the second antenna panel based on second PDCCH information sent by the target cell.

Here, the first PDCCH information and the second PDCCH information are different PDCCH information.

That is, the serving cell and the target cell send the PDCCH respectively, and send different PDCCHs, that is, each schedules the UE to communicate with the corresponding cell.

In the technical solution of the embodiments of the present disclosure, the UE communicates with the serving cell and the target cell by different antenna panels, hence realizing seamless handover, ensuring the continuity of communication during the handover process, and reducing handover interruption time, and improving terminal throughput and user experience.

Figure 3:
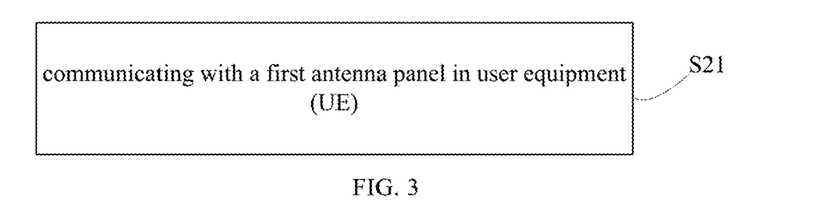
FIG. 3 is a flowchart of a communication processing method according to an embodiment of the disclosure.

FIG. 3 is a flowchart 2 of a communication processing method according to an embodiment of the disclosure. As illustrated in FIG. 3, the communication processing method is used in a serving base station. The method includes the following steps.

At step S21, the serving base station communicates with a first antenna panel in user equipment (UE).

In some embodiments, communicating with the first antenna panel in the UE includes:

sending PDCCH information to the UE. Scheduling information for scheduling PDSCH or PUSCH of a serving cell and scheduling information for scheduling PDSCH or PUSCH of a target cell are carried in same PDCCH information.

In some embodiments, communicating with the first antenna panel in the UE includes:

sending PDCCH information to the UE. Scheduling information for scheduling PDSCH or PUSCH of a serving cell and scheduling information for scheduling PDSCH or PUSCH of a target cell are carried in different PDCCH information.

In some embodiments, communicating with the first antenna panel in the UE includes:

sending first PDCCH information to the UE. Scheduling information for scheduling PDSCH or PUSCH of a serving cell is carried in the first PDCCH information.

With the technical solution in the embodiments of the disclosure, it is conducive to the UE to communicate with the serving cell and the target cell respectively by different antenna panels, hence realizing seamless handover, and ensuring the continuity of communication during the handover process.

Figure 4:
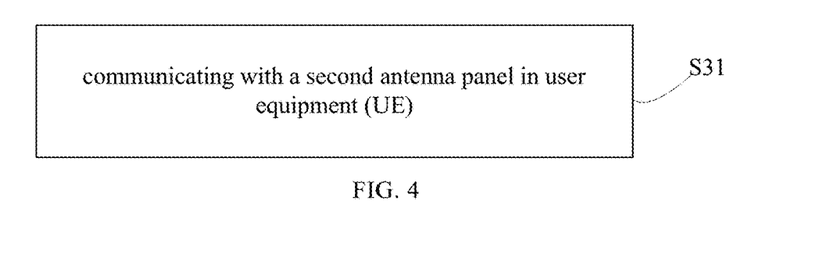
FIG. 4 is a flowchart of a communication processing method according to an embodiment of the disclosure.

FIG. 4 is a flowchart 3 of a communication processing method according to an embodiment of the disclosure. As illustrated in FIG. 4, the communication processing method is used in a target base station. The method includes the following steps.

At step S31, the target base station communicates with a second antenna panel in user equipment (UE).

In some embodiments, communicating with the second antenna panel in the UE includes:

sending physical downlink control channel (PDCCH) information to the UE. Scheduling information for scheduling PDSCH or PUSCH of a serving cell and scheduling information for scheduling PDSCH or PUSCH of a target cell are carried in same PDCCH information.

In some embodiments, communicating with the second antenna panel in the UE includes:

sending PDCCH information to the UE. Scheduling information for scheduling PDSCH or PUSCH of a serving cell and scheduling information for scheduling PDSCH or PUSCH of a target cell are carried in different PDCCH information.

In some embodiments, communicating with the second antenna panel in the UE includes:

sending second PDCCH information to the UE. Scheduling information for scheduling PDSCH or PUSCH of a target cell is carried in the second PDCCH information.

With the technical solution in the embodiments of the disclosure, it is conducive to the UE to communicate with the serving cell and the target cell respectively by different antenna panels, hence realizing seamless handover, and ensuring the continuity of communication during the handover process.

Figure 5:
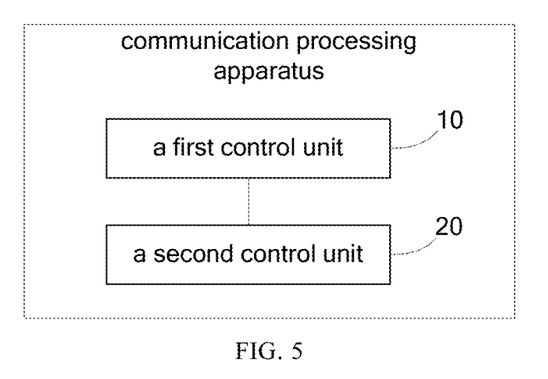
FIG. 5 is a block diagram of a communication processing apparatus according to an embodiment of the disclosure.

FIG. 5 is a block diagram 1 of a communication processing apparatus according to an embodiment of the disclosure. The communication processing apparatus is configured in a UE side. The UE at least includes a first antenna panel and a second antenna panel. As illustrated in FIG. 5, the apparatus includes a first control unit 10 and a second control unit 20.

The first control unit 10 is configured to communicate with a serving cell by the first antenna panel.

The second control unit 20 is configured to communicate with a target cell by the second antenna panel.

With the technical solution in the embodiments of the disclosure, the UE communicates with the serving cell and the target cell respectively by different antenna panels, hence realizing seamless handover, ensuring the continuity of communication during the handover process, and improving the throughput of the terminal at the same time.

In some embodiments, the second control unit 20 is configured to:

use the second antenna panel to communicate with the target cell in response to a measurement result measured by the second antenna panel being that a receiving signal of the target cell satisfies a first preset condition.

In some implementations, the first preset condition includes at least one of:

a difference value between a reference signal receiving power (RSRP) of the target cell and a RSRP of the serving cell is greater than a first threshold; or a difference value between reference signal receiving quality (RSRQ) of the target cell and RSRQ of the serving cell is greater than a second threshold; or a difference value between a signal to interference plus noise ratio (SINR) of the target cell and a SINR of the serving cell is greater than a third threshold.

That is, when the measurement result obtained by the UE using the second antenna panel is that the receiving signal of the target cell is better than the receiving signal of the serving cell, the UE uses the second antenna panel to communicate with the target cell.

In other implementations, the first preset condition includes at least one of:

a RSRP of the serving cell being smaller than a first reference value, and a RSRP of the target cell being greater than a second reference value, the second reference value being greater than or equal to the first reference value; or RSRQ of the serving cell being smaller than a third reference value, and RSRQ of the target cell being greater than a fourth reference value, the fourth reference value being greater than or equal to the third reference value; or a SINR of the serving cell being smaller than a fifth reference value, and a SINR of the target cell being greater than a sixth reference value, the sixth reference value being greater than or equal to the fifth reference value.

That is, when the measurement result obtained by the UE using the second antenna panel is that the receiving signal of the target cell is better, the UE uses the second antenna panel to communicate with the target cell.

The above RSRP, RSRQ, and SINR may be a value of L1 and/or a value of L3. The value of L1 is an instantaneous sampling value of a physical layer; the value of L3 is a radio resource management (RRM) measurement value obtained by averaging an average value of multiple physical layer sampling values by a sliding window.

In some embodiments, the second control unit 20 is configured to: performing random access with the target cell by the second antenna panel. The first control unit 10 is configured to disconnect connection between the first antenna panel and the serving cell in response to the random access being successful.

With the communication processing apparatus according to an embodiment of the disclosure, the first antenna panel of the terminal maintains communication with the serving cell during the process of using the second antenna panel to perform the random access with the target cell, and the first antenna panel may interrupt the communication with the serving cell only after the random access between the second antenna panel and the target cell is successful and the second antenna panel can communicate with the target cell normally. Therefore, the terminal has at least one antenna panel that maintains data communication with the serving cell or the target cell, hence enabling seamless handover and ensuring the continuity of communication during the handover process.

In the above solution, the first control unit 10 is configured to: after disconnecting the connection between the first antenna panel and the serving cell, determine a timing advance (TA) for communication between the first antenna panel and the target cell; and control the first antenna panel to perform data transmission with the target cell according to the TA.

With the communication processing apparatus according to an embodiment of the disclosure, after the random access between the second antenna panel and the target cell is successful, the UE disconnects the connection between the first antenna panel and the serving cell, and then the first antenna panel of the UE may hand over to the target cell. The TA of communication with the target cell may be obtained when the first antenna panel handovers to the target cell, so that the acquired TA can be used for data transmission with the target cell, which can realize the handover of the first antenna panel from the serving cell to the target cell, and both the first antenna and the second antenna panel are successfully handed over to the target cell, ensuring the continuity of communication during the handover process.

In the above solution, the first control unit 10 is configured to:

determine the TA of communication between the first antenna panel and the target cell by performing random access with the target cell through the first antenna panel; or determine the TA of communication between the first antenna panel and the target cell based on a TA value of communication between the second antenna panel and the target cell.

In some embodiments, the first control unit 10 is configured to: after the success of random access procedure to the target cell by the second antenna panel, continue communicating with the serving cell by the first antenna panel while communicating with the target cell by the second antenna panel, and disconnect connection between the first antenna panel and the serving cell until a second preset condition is satisfied. The second control unit 20 is configured to: after procedure random access procedure to the target cell by the second antenna panel, communicate with the target cell by the second antenna panel.

With the communication processing apparatus according to an embodiment of the disclosure, it can be ensured that each antenna panel is connected to the best cell to ensure the highest throughput.

In the above solution, the second preset condition includes at least one of:

a measurement result measured by the first antenna panel being that a receiving signal of the target cell satisfies a first preset condition; or completing transmission of data to be retransmitted by the first antenna panel, the data to be retransmitted referring to data that is transmitted once but is not successfully transmitted before connection between the second antenna panel and the serving cell is disconnected; or completing transmission of data to be sent to the UE and stored in a base station to which the serving cell belongs by the first antenna panel and the serving cell.

Here, the first preset condition is the same as the first preset condition mentioned above, and details are not repeated here. When the measurement result of the first antenna panel does not meet the first preset condition, it means that the channel condition when the first antenna panel maintains communication with the serving cell is better than the channel condition when the first antenna panel maintains communication with the target cell, so the first antenna panel maintains the communication with the serving cell, while the second antenna panel communicates with the target cell, so that each antenna panel communicates with the cell with the best channel condition, thus the throughput provided by the network to the terminal can be maximized.

Here, completing the transmission means that the transmission is successful, or the transmission is unsuccessful but a maximum number of retransmissions is reached. The maximum number of retransmissions may be set or adjusted according to actual conditions such as communication quality or communication speed.

Here, the data to be retransmitted refers to data transmitted between the serving cell and the UE, including both data transmitted between the first panel and the serving cell, and data transmitted between the second panel and the serving cell. These data refer to data that have been transmitted once but have not been successfully transmitted until a certain time point. The certain time point refers to a time point when the second antenna panel is disconnected from the serving cell.

In some embodiments, the first control unit 10 is configured to: based on PDCCH information sent by the serving cell or the target cell, perform PDSCH or PUSCH transmission with the serving cell using the first antenna panel. The second control unit 20 is configured to: perform PDSCH or PUSCH transmission with the target cell using the second antenna panel.

In some embodiments, scheduling information for scheduling the PDSCH or the PUSCH of the serving cell and scheduling information for scheduling the PDSCH or the PUSCH of the target cell are carried in same PDCCH information.

In some embodiments, scheduling information for scheduling the PDSCH or the PUSCH of the serving cell and scheduling information for scheduling the PDSCH or the PUSCH of the target cell are carried in different PDCCH information.

In some embodiments, the first control unit 10 is configured to: based on PDCCH information sent by the serving cell and the target cell, perform PDSCH or PUSCH transmission with the serving cell using the first antenna panel. The second control unit 20 is configured to: perform PDSCH or PUSCH transmission with the target cell using the second antenna panel.

The PDCCH information sent by the serving cell and the target cell are the same. The PDCCH information carries scheduling information for scheduling the PDSCH or the PUSCH of the serving cell, and/or scheduling information for scheduling the PDSCH or the PUSCH of the target cell.

In some embodiments, the first control unit 10 is configured to: perform PDSCH or the PUSCH transmission with the serving cell by the first antenna panel based on first PDCCH information sent by the serving cell. The second control unit 20 is configured to: perform PDSCH or the PUSCH transmission with the target cell by the second antenna panel based on second PDCCH information sent by the target cell.

Regarding the apparatuses in the above-mentioned embodiments, the specific manner in which each module performs operations has been described in detail in the embodiments of the related method, and will not be described in detail here.

In practical use, the specific structures of the first control unit 10 and the second control unit 20 can be determined by a central processing unit (CPU), a micro controller unit (MCU), a digital signal processor (DSP) or a programmable logic controller (PLC) in the communication processing apparatus or the UE to which the communication processing apparatus belongs.

The communication processing apparatus of this embodiment may be disposed on the UE side.

It should be understood by those skilled in the art that the functions of each processing module in the communication processing apparatus according to the embodiment of the present disclosure can be comprehended by referring to the foregoing description of the communication processing method performed by the UE side. The respective processing modules in the communication processing apparatus according to the embodiment of the present disclosure may be implemented by an analog circuit that implements the functions described in the embodiments of the present disclosure, and may also be implemented by running software on a terminal that implements the functions described in the embodiments of the present disclosure.

With the communication processing apparatus in the embodiments of the disclosure, by communicating with the serving cell and the target cell using different antenna panels, it can realize seamless handover, ensuring the continuity of communication during the handover process.

Figure 6:
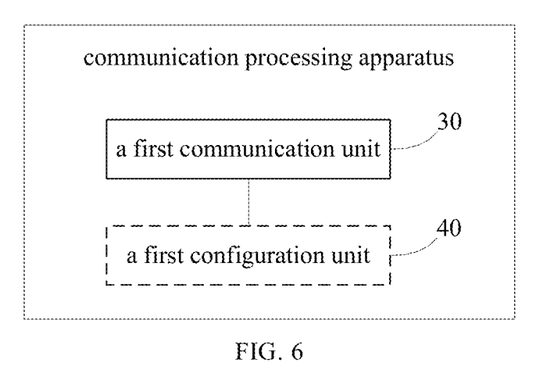
FIG. 6 is a block diagram of a communication processing apparatus according to an embodiment of the disclosure.

FIG. 6 is a block diagram 2 of a communication processing apparatus according to an embodiment of the disclosure. The communication processing apparatus is configured at a serving base station side. As illustrated in FIG. 6, the apparatus includes a first communication unit 30.

The first communication unit 30 is configured to communicate with a first antenna panel in user equipment (UE).

In some embodiments, the apparatus further includes:

A first configuration unit 40, configured to: configure PDCCH information.

In some embodiments, the first communication unit 30 is configured to:

send PDCCH information to the UE. Scheduling information for scheduling PDSCH or PUSCH of a serving cell and scheduling information for scheduling PDSCH or PUSCH of a target cell are carried in same PDCCH information.

In some embodiments, the first communication unit 30 is configured to:

send PDCCH information to the UE. Scheduling information for scheduling PDSCH or PUSCH of a serving cell and scheduling information for scheduling PDSCH or PUSCH of a target cell are carried in different PDCCH information.

In some embodiments, the first communication unit 30 is configured to:

send first PDCCH information to the UE. Scheduling information for scheduling PDSCH or PUSCH of a serving cell is carried in the first PDCCH information.

Regarding the apparatuses in the above-mentioned embodiments, the specific manner in which each module performs operations has been described in detail in the embodiments of the related method, and will not be described in detail here.

In practical use, the specific structures of the first communication unit 30 and the first configuration unit 40 can be determined by a CPU, a MCU, a DSP or a PLC in the communication processing apparatus or the serving base station to which the communication processing apparatus belongs.

The communication processing apparatus of this embodiment may be disposed on the serving base station side.

It should be understood by those skilled in the art that the functions of each processing module in the communication processing apparatus according to the embodiment of the present disclosure can be comprehended by referring to the foregoing description of the communication processing method performed at the serving base station side. The respective processing modules in the communication processing apparatus according to the embodiment of the present disclosure may be implemented by an analog circuit that implements the functions described in the embodiments of the present disclosure, and may also be implemented by running software on a terminal that implements the functions described in the embodiments of the present disclosure.

With the communication processing apparatus in the embodiments of the disclosure, it is conducive to the UE to communicate with the serving cell and the target cell respectively by different antenna panels, hence realizing seamless handover, and ensuring the continuity of communication during the handover process.

Figure 7:
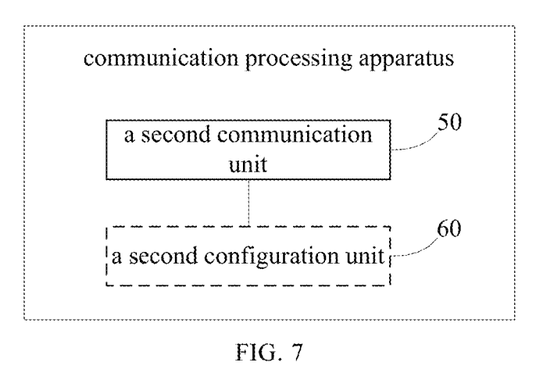
FIG. 7 is a block diagram of a communication processing apparatus according to an embodiment of the disclosure.

FIG. 7 is a block diagram 3 of a communication processing apparatus according to an embodiment of the disclosure. The communication processing apparatus is configured at a target base station side. As illustrated in FIG. 7, the apparatus includes a second communication unit 50.

The second communication unit 50 is configured to communicate with a second antenna panel in user equipment (UE).

In some embodiments, the apparatus further includes:

A second configuration unit 60, configured to: configure PDCCH information.

In some embodiments, the second communication unit 50 is configured to:

send physical downlink control channel (PDCCH) information to the UE. Scheduling information for scheduling PDSCH or PUSCH of a serving cell and scheduling information for scheduling PDSCH or PUSCH of a target cell are carried in same PDCCH information.

In some embodiments, the second communication unit 50 is configured to:

send PDCCH information to the UE. Scheduling information for scheduling PDSCH or PUSCH of a serving cell and scheduling information for scheduling PDSCH or PUSCH of a target cell are carried in different PDCCH information.

In some embodiments, the second communication unit 50 is configured to:

send second PDCCH information to the UE. Scheduling information for scheduling PDSCH or PUSCH of a target cell is carried in the second PDCCH information.

Regarding the apparatuses in the above-mentioned embodiments, the specific manner in which each module performs operations has been described in detail in the embodiments of the related method, and will not be described in detail here.

In practical use, the specific structures of the second communication unit 50 and the second configuration unit 60 can be determined by a CPU, a MCU, a DSP or a PLC in the communication processing apparatus or the target base station to which the communication processing apparatus belongs.

The communication processing apparatus of this embodiment may be disposed on the target base station side.

It should be understood by those skilled in the art that the functions of each processing module in the communication processing apparatus according to the embodiment of the present disclosure can be comprehended by referring to the foregoing description of the communication processing method performed at the target base station side. The respective processing modules in the communication processing apparatus according to the embodiment of the present disclosure may be implemented by an analog circuit that implements the functions described in the embodiments of the present disclosure, and may also be implemented by running software on a terminal that implements the functions described in the embodiments of the present disclosure.

With the communication processing apparatus in the embodiments of the disclosure, it is conducive to the UE to communicate with the serving cell and the target cell respectively by different antenna panels, hence realizing seamless handover, and ensuring the continuity of communication during the handover process.

Figure 8:
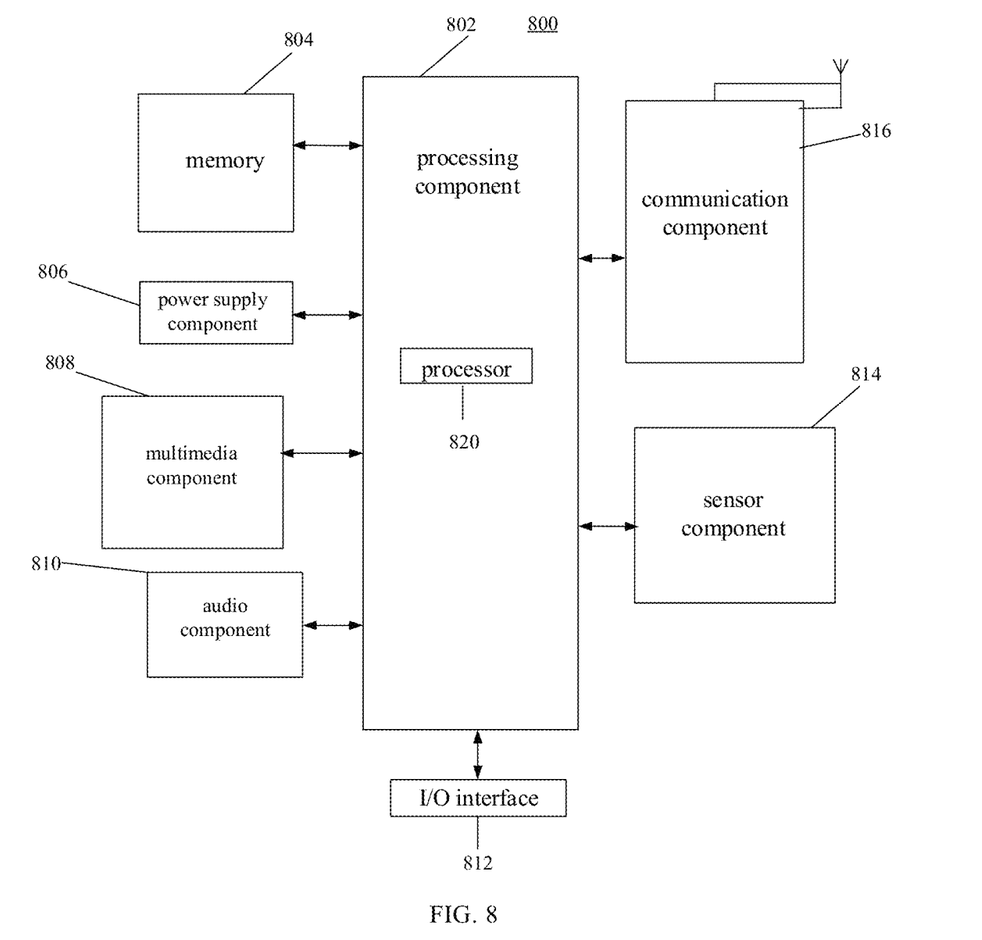
FIG. 8 is a block diagram of a device for implementing communication processing according to an embodiment of the disclosure.

FIG. 8 is a block diagram of a device 800 for implementing communication processing according to an embodiment of the disclosure. For example, the device 800 may be a mobile phone, a computer, a digital broadcasting terminal, a messaging device, a game console, a tablet device, a medical equipment, a fitness equipment, a personal digital assistant, and so on.

Referring to FIG. 8, the device 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the device 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the device 800. Examples of the data include the instructions of any applications or methods operated on the device 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the device 800. The power supply component 806 may include a power supply management system, one or more power supplies, and other units related to generating, managing and distributing power for the device 800.

The multimedia component 808 includes an output interface screen provided between the device 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the device 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the device 800 is in an operation mode, such as a call mode, a record mode, and a speech recognition mode, the microphone is configured to receive the external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the device 800. For example, the sensor component 814 may detect the on/off state of the device 800 and the relative positioning of the component. For example, the component is a display and a keypad of the device 800. The sensor component 814 may further detect the location change of the device 800 or one component of the device 800, the presence or absence of contact between the user and the device 800, the orientation or acceleration/deceleration of the device 800, and the temperature change of the device 800. The sensor component 814 may include a proximity sensor configured to detect the existence of the objects nearby without any physical contact. The sensor component 814 may further include a light sensor such as a complementary metal oxide semiconductor (CMOS) or a charge-coupled device (CCD) image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the device 800 and other devices. The device 800 may access wireless networks based on communication standard, such as WiFi, 2G or 3G; or their combination. In an embodiment, the communication component 816 receives broadcast signals or broadcast-related information from an external broadcast management system via a broadcast channel. In an embodiment, the communication component 816 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the device 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above communication processing methods performed by the user equipment.

In an embodiment, a non-transitory computer storage medium is further provided which includes executable instructions, such as the memory 804 including executable instructions, the executable instructions may be executed by the processor 820 of the device 800 to complete the above methods. For example, the non-transitory computer storage medium may be a ROM, a random access memory (RAM), a CD-ROM, a magnetic tape, a floppy disk, an optical data storage device, etc.

Figure 9:
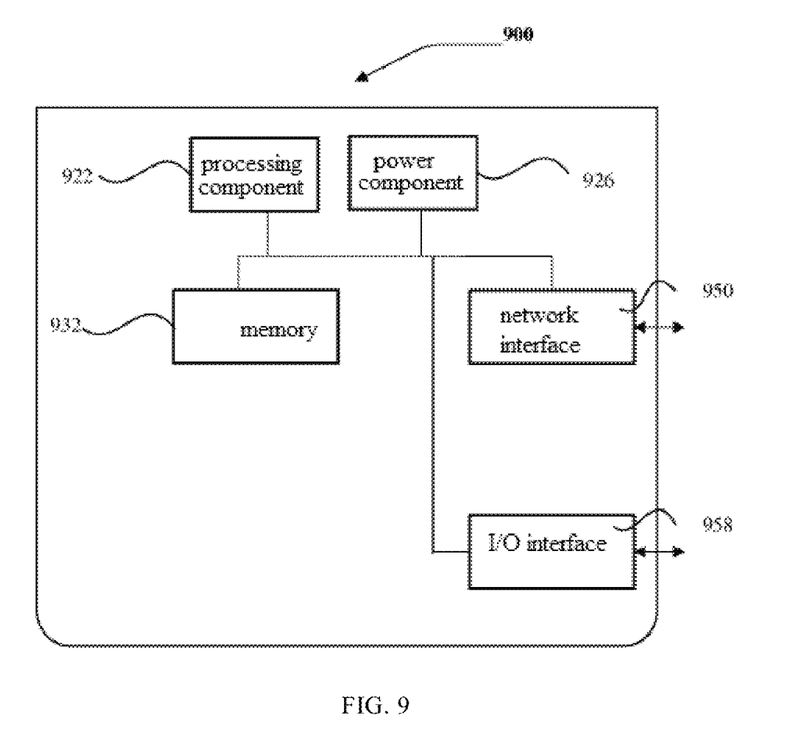
FIG. 9 is a block diagram of a device for implementing communication processing according to an embodiment of the disclosure.

FIG. 9 is a block diagram of a device 900 for implementing communication processing according to an embodiment of the disclosure. For example, the device 900 may be provided as a server. As illustrated in FIG. 9, the device 900 includes a processing component 922, which further includes one or more processors, and a memory resource represented by a memory 932, for storing instructions executable by the processing component 922, such as an application program. The application program stored in the memory 932 may include one or more modules each corresponding to a set of instructions. In addition, the processing component 922 is configured to execute the instructions to perform any of the communication processing methods described above.

The device 900 may also include a power component 926 configured to perform power management of the device 900, a wired or wireless network interface 950 configured to connect the device 900 to a network, and an input output (I/O) interface 958. The device 900 can operate based on an operating system stored in the memory 932, such as Windows Server™, Mac OS X™, Unix™, Linux™, FreeBSD™ or the like.

The technical solutions described in the embodiments of the present disclosure can be combined arbitrarily without conflict.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

What is claimed is:

1. A method for communicating with cells based on timing advances, performed by a user equipment (UE), the UE comprising at least a first antenna panel and a second antenna panel, the method comprising:
   communicating with a serving cell by the first antenna panel according to a first timing advanced (TA); after a success of a random access procedure to a target cell by the second antenna panel, continuously communicating with the serving cell by the first antenna panel according to the first TA and communicating with the target cell by the second antenna panel according to a second timing advance (TA); and
   communicating with the target cell by the first antenna panel according to the first TA after disconnecting connection between the first antenna panel and the serving cell, and communicating with the target cell by the second antenna panel according to the second TA.

2. The method as claimed in claim 1, wherein communicating with the target cell by the second antenna panel according to the second TA comprises:
   communicating with the target cell by the second antenna panel according to the second TA in response to a measurement result measured by the second antenna panel being that a receiving signal of the target cell satisfies a first preset condition.

3. The method as claimed in claim 2, wherein the first preset condition comprises at least one of:
   a difference value between a reference signal receiving power (RSRP) of the target cell and a RSRP of the serving cell is greater than a first threshold; or
   a difference value between reference signal receiving quality (RSRQ) of the target cell and RSRQ of the serving cell is greater than a second threshold; or
   a difference value between a signal to interference plus noise ratio (SINR) of the target cell and a SINR of the serving cell is greater than a third threshold, or
   a RSRP of the serving cell being smaller than a first reference value, and a RSRP of the target cell being greater than a second reference value, wherein the second reference value is greater than or equal to the first reference value; or
   a RSRQ of the serving cell being smaller than a third reference value, and a RSRQ of the target cell being greater than a fourth reference value, wherein the fourth reference value is greater than or equal to the third reference value; or
   a SINR of the serving cell being smaller than a fifth reference value, and a SINR of the target cell being greater than a sixth reference value, wherein the sixth reference value is greater than or equal to the fifth reference value.

4. The method as claimed in claim 1, wherein communicating with the target cell by the first antenna panel according to the first TA after disconnecting connection between the first antenna panel and the serving cell comprises:
   disconnecting connection between the first antenna panel and the serving cell until a second preset condition is satisfied, and
   communicating with the target cell by the first antenna panel according to the first TA.

5. The method as claimed in claim 1, wherein disconnecting connection between the first antenna panel and the serving cell comprises: disconnecting connection between the first antenna panel and the serving cell until a second preset condition is satisfied, wherein the second preset condition comprises at least one of:
  a measurement result measured by the first antenna panel being that a receiving signal of the target cell satisfies a first preset condition;
  completing transmission of data to be retransmitted by the first antenna panel, wherein the data to be retransmitted refers to data that is transmitted once but is not successfully transmitted before connection between the second antenna panel and the serving cell is disconnected; or
  completing transmission of data to be sent to the UE and stored in a base station to which the serving cell belongs by the first antenna panel and the serving cell.

6. The method as claimed in claim 1, wherein communicating with the serving cell by the first antenna panel according to the first TA and communicating with the target cell by the second antenna panel according to the second TA comprises:
  based on physical downlink control channel (PDCCH) information sent by the serving cell or the target cell, performing physical downlink shared channel (PDSCH) or physical uplink shared channel (PUSCH) transmission with the serving cell by the first antenna panel, and performing PDSCH or PUSCH transmission with the target cell by the second antenna panel according to the second TA.

7. The method as claimed in claim 6, wherein scheduling information for scheduling PDSCH or PUSCH of the serving cell and scheduling information for scheduling PDSCH or PUSCH of the target cell are carried in different PDCCH information, or
  wherein scheduling information for scheduling PDSCH or PUSCH of the serving cell and scheduling information for scheduling PDSCH or PUSCH of the target cell are carried in same PDCCH information.

8. The method as claimed in claim 1, wherein communicating with the serving cell by the first antenna panel according to the first TA and communicating with the target cell by the second antenna panel according to the second TA comprises:
  performing PDSCH or PUSCH transmission with the serving cell by the first antenna panel based on first PDCCH information sent by the serving cell; and
  performing PUSCH transmission with the target cell by the second antenna panel according to the second TA based on second PDCCH information sent by the target cell.

9. A user equipment (UE), comprising:
a processor; and
a memory for storing instructions executable by the processor,
wherein the processor is configured to execute the method of claim 1.

10. A method for communicating with cells based on timing advances, performed by a serving base station, the method comprising:
  communicating with a first antenna panel of a user equipment (UE), wherein the first antenna panel is configured to communicate with a serving cell according to a first timing advance (TA), continuously communicate with the serving cell according to the first TA after a success of a random access procedure to a target cell by a second antenna panel of the UE, and communicate with the target cell according to the first TA after disconnecting with the serving cell, and the second antenna panel of the UE is configured to communicate with the target cell according to a second TA.

11. The method as claimed in claim 10, further comprising:
  sending physical downlink control channel (PDCCH) information to the UE, wherein scheduling information for scheduling physical downlink shared channel (PDSCH) or physical uplink shared channel (PUSCH) of the serving cell and scheduling information for scheduling PDSCH or PUSCH of the target cell are carried in same PDCCH information;
  or
  sending PDCCH information to the UE, wherein scheduling information for scheduling PDSCH or PUSCH of the serving cell and scheduling information for scheduling PDSCH or PUSCH of the target cell are carried in different PDCCH information.

12. The method as claimed in claim 10, further comprising:
  sending first PDCCH information to the UE, wherein scheduling information for scheduling PDSCH or PUSCH of the serving cell is carried in the first PDCCH information.

13. A serving base station, comprising:
a processor; and
a memory for storing instructions executable by the processor,
wherein the processor is configured to execute the method of claim 10.

14. A method for communicating with cells based on timing advances, performed by a target base station, the method comprising:
  communicating with a first antenna panel of a user equipment (UE), and communicating with a second antenna panel of the UE, wherein the first antenna panel is configured to communicate with a serving cell according to a first timeing advance (TA), continuously communicate with the serving cell according to the first TA after a success of a random access procedure to a target cell by the second antenna panel of the UE, and communicate with the target cell according to the first TA after disconnecting with the serving cell, and the second antenna panel is configured to communicate with the target cell according to a second TA.

15. The method as claimed in claim 14, wherein further comprising:
  sending physical downlink control channel (PDCCH) information to the UE, wherein scheduling information for scheduling physical downlink shared channel (PDSCH) or physical uplink shared channel (PUSCH) of the serving cell and scheduling information for scheduling PDSCH or PUSCH of the target cell are carried in same PDCCH information;
  or,
  sending PDCCH information to the UE, wherein scheduling information for scheduling PDSCH or PUSCH of the serving cell and scheduling information for scheduling PDSCH or PUSCH of the target cell are carried in different PDCCH information.

16. The method as claimed in claim 14, further comprising:
  sending second PDCCH information to the UE, wherein scheduling information for scheduling PUSCH of the target cell is carried in the second PDCCH information.

17. A target base station, comprising:
   a processor; and
   a memory for storing instructions executable by the processor,
wherein the processor is configured to execute the method of claim 14.

* * * * *